US007310345B2

(12) United States Patent  (10) Patent No.: US 7,310,345 B2
Goetzinger et al.  (45) Date of Patent: Dec. 18, 2007

(54) EMPTY INDICATORS FOR WEIGHTED FAIR QUEUES

(75) Inventors: William John Goetzinger, Rochester, MN (US); Glen Howard Handlogten, Rochester, MN (US); James Francis Mikos, Rochester, MN (US); David Alan Norgaard, Rochester, MN (US); Daniel James Sucher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 10/002,085

(22) Filed: Nov. 1, 2001

(65) Prior Publication Data

US 2003/0081542 A1   May 1, 2003

(51) Int. Cl.
*H04L 12/54*   (2006.01)
(52) U.S. Cl. .................................... 370/412; 370/428
(58) Field of Classification Search ................ 370/412, 370/413, 414, 415, 416, 417, 418, 419, 429, 370/395.4
See application file for complete search history.

(56) References Cited

U.S. PATENT DOCUMENTS

| | | | |
|---|---|---|---|
| 4,621,359 A | 11/1986 | McMillen | |
| 5,249,184 A | 9/1993 | Woest et al. | |
| 5,363,485 A * | 11/1994 | Nguyen et al. | 710/113 |
| 5,490,141 A | 2/1996 | Lai et al. | |
| 5,548,590 A | 8/1996 | Grant et al. | |
| 5,629,928 A | 5/1997 | Calvignac et al. | |
| 5,650,993 A | 7/1997 | Lakshman et al. | |
| 5,742,772 A | 4/1998 | Sreenan | |
| 5,790,545 A | 8/1998 | Holt et al. | |
| 5,831,971 A | 11/1998 | Bonomi et al. | |
| 5,835,494 A | 11/1998 | Hughes et al. | |
| 5,844,890 A | 12/1998 | Delp et al. | |
| 5,850,399 A | 12/1998 | Ganmukhi et al. | |
| 5,905,730 A | 5/1999 | Yang et al. | |
| 5,926,459 A | 7/1999 | Lyles et al. | |
| 5,926,481 A | 7/1999 | Wang et al. | |
| 5,946,297 A | 8/1999 | Calvignac et al. | |
| 5,999,963 A | 12/1999 | Bruno et al. | |

(Continued)

FOREIGN PATENT DOCUMENTS

EP    0859492 A2   8/1998

(Continued)

OTHER PUBLICATIONS

"Estimating Clock Speeds for the ATMSWITCH Architecture", Proc. NETWORKS '99 (The Third New Zealand ATM and Broadband Workshop), Jan. 21-22, 1999, pp. 39-53: Lyons, P.J. and Yan, Bo (1999).*

(Continued)

*Primary Examiner*—Hassan Kizou
*Assistant Examiner*—Salman Ahmed
(74) *Attorney, Agent, or Firm*—Dugan & Dugan P.C.

(57) ABSTRACT

A scheduler for a network processor includes one or more scheduling queues. Each scheduling queue defines a respective sequence in which flows are to be serviced. A respective empty indicator is associated with each scheduling queue to indicate whether the respective scheduling queue is empty. By referring to the empty indicators, it is possible to avoid wasting operating cycles of the scheduler on searching scheduling queues that are empty.

12 Claims, 6 Drawing Sheets

U.S. PATENT DOCUMENTS

| | | |
|---|---|---|
| 6,014,367 A | 1/2000 | Joffe |
| 6,018,527 A | 1/2000 | Yin et al. |
| 6,028,842 A | 2/2000 | Chapman et al. |
| 6,028,843 A | 2/2000 | Delp et al. |
| 6,031,822 A | 2/2000 | Wallmeier |
| 6,038,217 A | 3/2000 | Lyles |
| 6,041,059 A | 3/2000 | Joffe et al. |
| 6,052,751 A | 4/2000 | Runaldue et al. |
| 6,064,650 A | 5/2000 | Kappler et al. |
| 6,064,677 A | 5/2000 | Kappler et al. |
| 6,067,301 A | 5/2000 | Aatresh |
| 6,072,772 A | 6/2000 | Charny et al. |
| 6,072,800 A | 6/2000 | Lee |
| 6,078,953 A | 6/2000 | Vaid et al. |
| 6,081,507 A | 6/2000 | Chao et al. |
| 6,092,115 A | 7/2000 | Choudhury et al. |
| 6,094,435 A | 7/2000 | Hoffman et al. |
| 6,101,193 A | 8/2000 | Ohba |
| 6,104,700 A | 8/2000 | Haddock et al. |
| 6,108,307 A | 8/2000 | McConnell et al. |
| 6,115,807 A * | 9/2000 | Grochowski ............... 712/212 |
| 6,122,673 A | 9/2000 | Basak et al. |
| 6,144,669 A | 11/2000 | Williams et al. |
| 6,157,614 A | 12/2000 | Pasternak et al. |
| 6,157,649 A | 12/2000 | Peirce et al. |
| 6,157,654 A | 12/2000 | Davis |
| 6,160,812 A | 12/2000 | Bauman et al. |
| 6,169,740 B1 | 1/2001 | Morris et al. |
| 6,188,698 B1 | 2/2001 | Galand et al. |
| 6,226,267 B1 | 5/2001 | Spinney et al. |
| 6,229,812 B1 | 5/2001 | Parruck et al. |
| 6,229,813 B1 | 5/2001 | Buchko et al. |
| 6,236,647 B1 | 5/2001 | Amalfitano |
| 6,246,692 B1 | 6/2001 | Dai et al. |
| 6,259,699 B1 | 7/2001 | Opalka et al. |
| 6,266,702 B1 | 7/2001 | Darnell et al. |
| 6,314,478 B1 * | 11/2001 | Etcheverry ............... 710/29 |
| 6,356,546 B1 | 3/2002 | Beshai |
| 6,389,019 B1 | 5/2002 | Fan et al. |
| 6,389,031 B1 | 5/2002 | Chao et al. |
| 6,404,768 B1 | 6/2002 | Basak et al. |
| 6,469,982 B1 | 10/2002 | Henrion et al. |
| 6,481,251 B1 * | 11/2002 | Meier et al. ............... 70/52 |
| 6,563,829 B1 | 5/2003 | Lyles et al. |
| 6,608,625 B1 | 8/2003 | Chin et al. |
| 6,611,522 B1 | 8/2003 | Zheng et al. |
| 6,646,986 B1 | 11/2003 | Beshai |
| 6,647,505 B1 * | 11/2003 | Dangi et al. ............... 713/502 |
| 6,721,325 B1 | 4/2004 | Duckering et al. |
| 6,775,287 B1 | 8/2004 | Fukano et al. |
| 6,804,249 B1 | 10/2004 | Bass et al. |
| 6,810,012 B1 | 10/2004 | Yin et al. |
| 6,810,043 B1 * | 10/2004 | Naven et al. ............... 370/412 |
| 6,810,426 B2 | 10/2004 | Mysore et al. |
| 6,813,274 B1 | 11/2004 | Suzuki et al. |
| 6,832,261 B1 | 12/2004 | Westbrook et al. |
| 6,850,490 B1 | 2/2005 | Woo et al. |
| 6,885,664 B2 | 4/2005 | Ofek et al. |
| 6,888,830 B1 | 5/2005 | Snyder, II et al. |
| 6,891,835 B2 | 5/2005 | Kalkunte et al. |
| 7,020,137 B2 | 3/2006 | Kadambi et al. |
| 7,027,394 B2 * | 4/2006 | Gupta et al. ............. 370/230.1 |
| 2001/0004363 A1 | 6/2001 | Usukura |
| 2001/0012294 A1 | 8/2001 | Kadambi et al. |
| 2002/0003795 A1 | 1/2002 | Oskouy et al. |
| 2002/0023168 A1 | 2/2002 | Bass et al. |
| 2002/0024830 A1 * | 2/2002 | Yoneda ............... 365/49 |
| 2002/0136230 A1 | 9/2002 | Dell et al. |
| 2002/0163922 A1 | 11/2002 | Dooley et al. |
| 2002/0181455 A1 | 12/2002 | Norman et al. |
| 2003/0050954 A1 | 3/2003 | Tayyar et al. |
| 2003/0058875 A1 * | 3/2003 | Arndt et al. ............... 370/412 |
| 2003/0058879 A1 | 3/2003 | Rumph |
| 2003/0079080 A1 * | 4/2003 | DeMoney ............... 711/112 |

FOREIGN PATENT DOCUMENTS

| | | |
|---|---|---|
| EP | 0957602 A2 | 11/1999 |
| EP | 0 989 770 A1 | 3/2000 |
| EP | 1 049 352 A2 | 11/2000 |
| EP | 1061763 A2 | 12/2000 |
| JP | 04-094240 | 3/1992 |
| JP | 2000183886 A | 6/2000 |
| JP | 2000295247 A | 10/2000 |
| JP | 2001007822 A | 12/2000 |
| WO | 99/35792 | 7/1999 |
| WO | WO99/53647 A2 | 10/1999 |
| WO | WO99/53648 A2 | 10/1999 |
| WO | WO01/20876 A1 | 3/2001 |

OTHER PUBLICATIONS

Lyons et al. (Third New Zealand ATM and Broadband Workshop: Title- Estimating Clock Speeds for ihe ATMSWITCH Architecture).*

Lo Bello, L et al. (A multi-ring scheduling strategy for Profibus networks) Industrial Electronics Society, 2001. IECON '01. The 27th Annual Conference of the IEEE vol. 3, Nov. 29-Dec. 2, 2001 pp. 2144-2148 vol. 3.*

Koppelman (Congested Banyan network analysis using congested-queue states and neighboring-queue effects); Networking, IEEE/ACM Transactions on vol. 4, Issue 1, Feb. 1996 pp. 106-111.*

Chen et al. (Dynamic queue assignment in a VC queue manager for gigabit ATM networks); ATM Workshop Proceedings, 1998 IEEE May 26-29, 1998 pp. 3-10.*

U.S. Appl. No. 10/102,343, filed Mar. 20, 2002, "Network Processor Having Fast Flow Queue Disable Process".

U.S. Appl. No. 10/102,166, filed Mar. 20, 2002, "Method and Apparatus for Improving the Fairness of New Attaches to a Weighted Fair Queue in a Quality of Service (QoS) Scheduler".

Abstract of Publication entitled "Design of packet-fair queuing schedulers using a RAM-based searching engine" by HJ Chao et al, IEEE Journal on Selected Areas in Communications, vol. 17, No. 6, pp. 1105-1126, Jun. 1999.

U.S. Appl. No. 10/015,994, filed Nov. 1, 2001, titled "Weighted Fair Queue Serving Plural Output Ports".

U.S. Appl. No. 10/015,760, filed Nov. 1, 2001, titled "Weighted Fair Queue Having Adjustable Scaling Factor".

U.S. Appl. No. 10/016,518, filed Nov. 1, 2001, titled "Weighted Fair Queue Having Extended Effective Range".

U.S. Appl. No. 10/004,373, filed Nov. 1, 2001, titled "QoS Scheduler and Method for Implementing Peak Service Distance Using Next Peak Service Time Violated Indication".

U.S. Appl. No. 10/002,416, filed Nov. 1, 2001, titled "QoS Scheduler and Method for Implementing Quality of Service with Aging Time Stamps".

U.S. Appl No. 10/004,440, filed Nov. 1, 2001, titled "QoS Scheduler and Method for Implementing Quality of Service with Cached Status Array".

U.S. Appl. No. 10/004,217, filed Nov. 1, 2001, titled "QoS Scheduler and Method for Implementing Quality of Service Anticipating the End of a Chain of Flows".

* cited by examiner

EMPTY INDICATORS FOR WEIGHTED FAIR QUEUES

CROSS REFERENCE TO RELATED PATENT APPLICATIONS

The present application is related to the following U.S. Patent Applications, each of which is hereby incorporated by reference herein in its entirety:

U.S. patent application Ser. No. 10/016,518, filed Nov. 11, 2001, titled "WEIGHTED FAIR QUEUE HAVING EXTENDED EFFECTIVE RANGE", U.S. patent application Ser. No. 10/015,994, filed Nov. 11, 2001, titled "WEIGHTED FAIR QUEUE SERVING PLURAL OUTPUT PORTS", U.S. patent application Ser. No. 10/015,760, filed Nov. 11, 2001, titled "WEIGHTED FAIR QUEUE HAVING ADJUSTABLE SCALING FACTOR", U.S. patent application Ser. No. 10/004,373, filed Nov. 11, 2001, titled "QoS SCHEDULER AND METHOD FOR IMPLEMENTING PEAK SERVICE DISTANCE USING NEXT PEAK SERVICE TIME VIOLATED INDICATION", U.S. patent application Ser. No. 10/002,416, filed Nov. 11, 2001, titled "QoS SCHEDULER AND METHOD FOR IMPLEMENTING QUALITY OF SERVICE WITH AGING STAMPS", U.S. patent application Ser. No. 10/004,440, filed Nov. 11, 2001, titled "QoS SCHEDULER AND METHOD FOR IMPLEMENTING QUALITY OF SERVICE WITH CACHED STATUS ARRAY", and U.S. patent application Ser. No. 10/004,217, filed Nov. 11, 2001, titled "QoS SCHEDULER AND METHOD FOR IMPLEMENTING QUALITY OF SERVICE ANTICIPATING THE END OF A CHAIN OF FLOWS",

FIELD OF THE INVENTION

The present invention is concerned with data and storage communication systems and is more particularly concerned with a scheduler component of a network processor.

BACKGROUND OF THE INVENTION

Data and storage communication networks are in widespread use. In many data and storage communication networks, data packet switching is employed to route data packets or frames from point to point between source and destination, and network processors are employed to handle transmission of data into and out of data switches.

Figure 1:
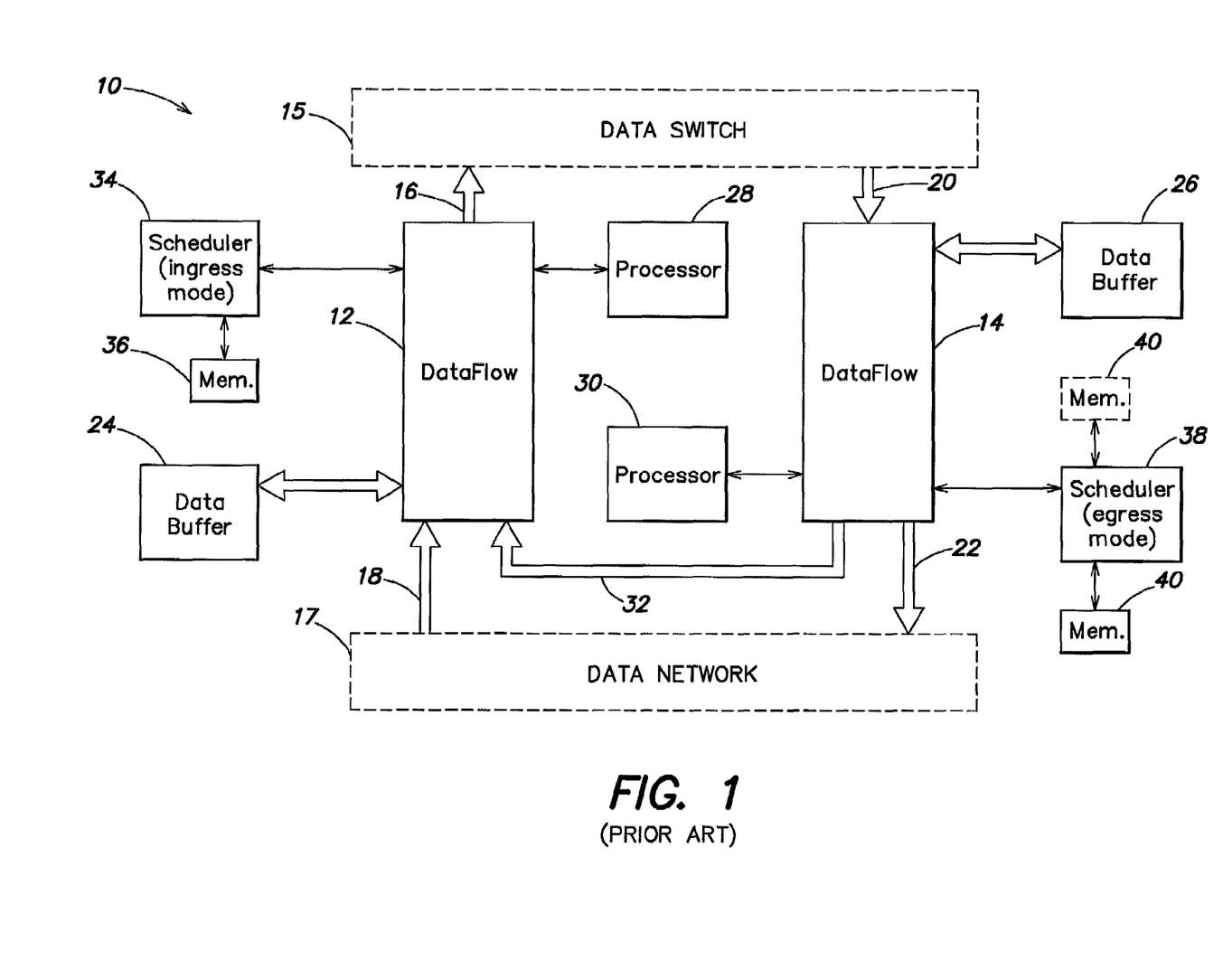
FIG. 1 is a block diagram of a conventional network processor in which the present invention may be applied.

FIG. 1 is a block diagram illustration of a conventional network processor in which the present invention may be applied. The network processor, which is generally indicated by reference numeral 10, may be constituted by a number of components mounted on a card or "blade". Within a data communication network, a considerable number of blades containing network processors may be interposed between a data switch and a data network.

The network processor 10 includes data flow chips 12 and 14. The first data flow chip 12 is connected to a data switch 15 (shown in phantom) via first switch ports 16, and is connected to a data network 17 (shown in phantom) via first network ports 18. The first data flow chip 12 is positioned on the ingress side of the switch 15 and handles data frames that are inbound to the switch 15.

The second data flow chip 14 is connected to the switch 15 via second switch ports 20 and is connected to the data network 17 via second network ports 22. The second data flow chip 14 is positioned on the egress side of the switch 15 and handles data frames that are outbound from the switch 15.

As shown in FIG. 1, a first data buffer 24 is coupled to the first data flow chip 12. The first data buffer 24 stores inbound data frames pending transmission of the inbound data frames to the switch 15. A second data buffer 26 is coupled to the second data flow chip 14, and stores outbound data frames pending transmission of the outbound data frames to the data network 17.

The network processor 10 also includes a first processor chip 28 coupled to the first data flow chip 12. The first processor chip 28 supervises operation of the first data flow chip 12 and may include multiple processors. A second processor chip 30 is coupled to the second data flow chip 14, supervises operation of the second data flow chip 14 and may include multiple processors.

A control signal path 32 couples an output terminal of second data flow chip 14 to an input terminal of first data flow chip 12 (e.g., to allow transmission of data frames therebetween).

The network processor 10 further includes a first scheduler chip 34 coupled to the first data flow chip 12. The first scheduler chip 34 manages the sequence in which inbound data frames are transmitted to the switch 15 via first switch ports 16. A first memory 36 such as a fast SRAM is coupled to the first scheduler chip 34 (e.g., for storing data frame pointers and flow control information as described further below). The first memory 36 may be, for example, a QDR (quad data rate) SRAM.

A second scheduler chip 38 is coupled to the second data flow chip 14. The second scheduler chip 38 manages the sequence in which data frames are output from the second network ports 22 of the second data flow chip 14. Coupled to the second scheduler chip 38 are at least one and possibly two memories (e.g., fast SRAMs 40) for storing data frame pointers and flow control information. The memories 40 may, like the first memory 36, be QDRs. The additional memory 40 on the egress side of the network processor 10 may be needed because of a larger number of flows output through the second network ports 22 than through the first switch ports 16.

Figure 2:
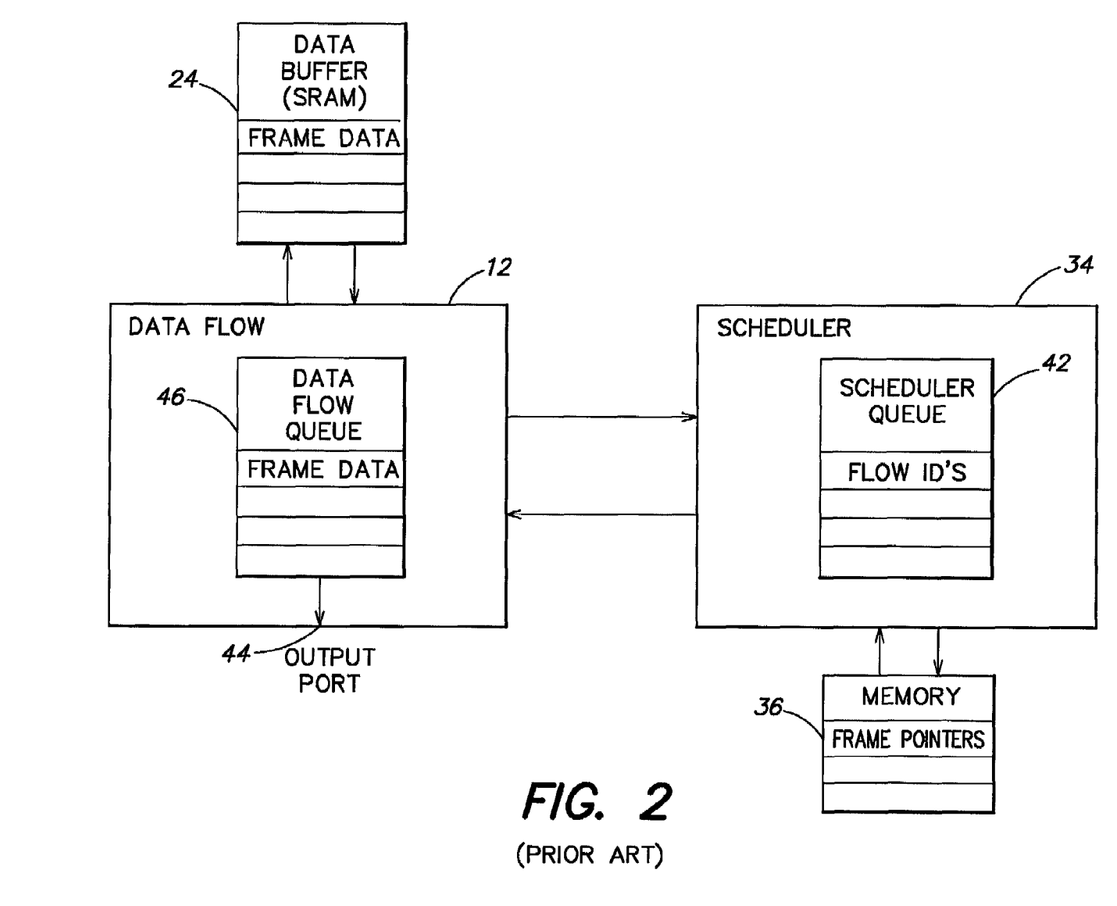
FIG. 2 is a block diagram representation of conventional queuing arrangements provided in a data flow chip/scheduler pair included in the network processor of FIG. 1.

FIG. 2 schematically illustrates conventional queuing arrangements that may be provided for a data flow chip/scheduler pair (either the first data flow chip 12 and the first scheduler chip 34 or the second data flow chip 14 and the second scheduler chip 38) of the network processor 10 of FIG. 1. In the particular example illustrated in FIG. 2, the first data flow chip 12 and the first scheduler chip 34 are illustrated, but a very similar queuing arrangement may be provided in connection with the second data flow chip 14 and the second scheduler chip 38. In the queuing arrangement for the first data flow chip 12 and the first scheduler chip 34, incoming data frames (from data network 17) are buffered in the input data buffer 24 associated with the first data flow chip 12 (FIG. 1). Each data frame is associated with a data flow or "flow". As is familiar to those who are skilled in the art, a "flow" represents a one-way connection between a source and a destination.

Flows with which the incoming data frames are associated are enqueued in a scheduling queue 42 maintained in the first scheduler chip 34. The scheduling queue 42 defines a sequence in which the flows enqueued therein are to be serviced. The particular scheduling queue 42 of interest in connection with the present invention is a weighted fair queue which arbitrates among flows entitled to a "best effort" or "available bandwidth" Quality of Service (QoS).

As shown in FIG. 2, the scheduling queue 42 is associated with a respective output port 44 of the first data flow chip 12. It is to be understood that the output port 44 is one of the first switch ports 16 illustrated in FIG. 1. (However, if the data flow chip/scheduler pair under discussion were the egress side data flow chip 14 and scheduler chip 38, then the output port 44 would be one of the network ports 22.) Although only one scheduling queue 42 and one corresponding output port 44 are shown, it should be understood that in fact there may be plural output ports and corresponding scheduling queues each assigned to a respective port. (However, according to an alternative embodiment, disclosed in co-pending patent application Ser. No. 10/015,994, filed Nov. 1, 2001, a group of output ports may be associated with each scheduling queue 42. This co-pending patent application is incorporated herein by reference.)

Although not indicated in FIG. 2, the first scheduler chip 34 also includes flow scheduling calendars which define output schedules for flows which are entitled to a scheduled QoS with guaranteed bandwidth, thus enjoying higher priority than the flows governed by the scheduling queue 42.

The memory 36 associated with the first scheduler chip 34 holds pointers ("frame pointers") to locations in the first data buffer 24 corresponding to data frames associated with the flows enqueued in the scheduling queue 42. The memory 36 also stores flow control information, such as information indicative of the QoS to which flows are entitled.

When the scheduling queue 42 indicates that a particular flow enqueued therein is the next to be serviced, reference is made to the frame pointer in the memory 36 corresponding to the first pending data frame for the flow in question and the corresponding frame data is transferred from the first data buffer 24 to an output queue 46 associated with the output port 44.

Figure 3:
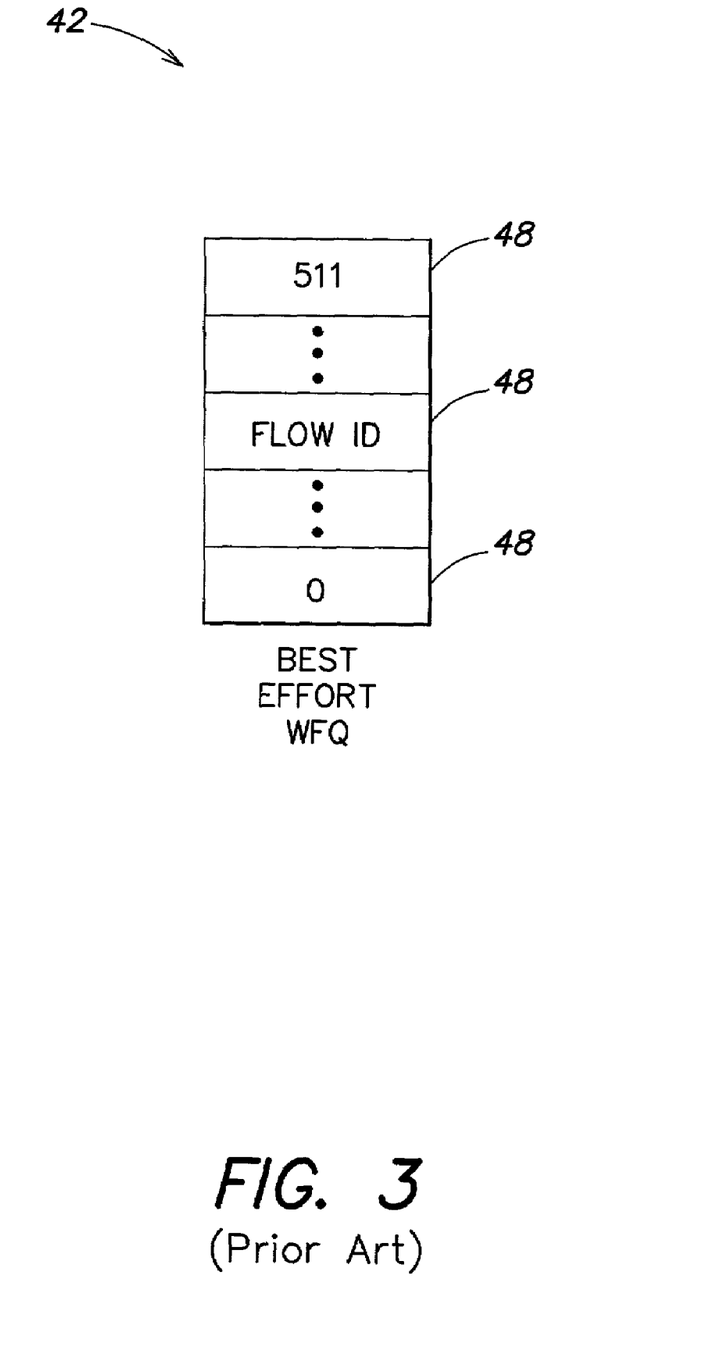
FIG. 3 is a pictorial representation of a weighted fair queuing scheduling queue provided in accordance with conventional practices.

A more detailed representation of the scheduling queue 42 is shown in FIG. 3. As noted above, the scheduling queue 42 is used for weighted fair queuing of flows serviced on a "best effort" basis. In a particular example of a scheduling queue as illustrated in FIG. 3, the scheduling queue 42 has 512 slots (each slot represented by reference numeral 48). Other numbers of slots may be employed. In accordance with conventional practice, flows are enqueued or attached to the scheduling queue 42 based on a formula that takes into account both a length of a data frame associated with a flow to be enqueued and a weight which corresponds to a QoS to which the flow is entitled.

More specifically, the queue slot in which a flow is placed upon enqueuing is calculated according to the formula $CP+((WF \times FS)/SF)$, where CP is a pointer ("current pointer") that indicates a current position (the slot currently being serviced) in the scheduling queue 42; WF is a weighting factor associated with the flow to be enqueued, the weighting factor having been determined on the basis of the QoS to which the flow is entitled; FS is the size of the current frame associated with the flow to be enqueued; and SF is a scaling factor chosen to scale the product (WF×FS) so that the resulting quotient falls within the range defined by the scheduling queue 42. (In accordance with conventional practice, the scaling factor SF is conveniently defined as a integral power of 2—i.e., $SF=2^n$, with n being a positive integer—so that scaling the product (WF×FS) is performed by right shifting.) With this known weighted fair queuing technique, the weighting factors assigned to the various flows in accordance with the QoS assigned to each flow govern how close to the current pointer of the queue each flow is enqueued. In addition, flows which exhibit larger frame sizes are enqueued farther from the current pointer of the queue, to prevent such flows from appropriating an undue proportion of the available bandwidth of the queue. Upon enqueuement, data that identifies a flow (the "Flow ID") is stored in the appropriate queue slot 48.

As noted above, each scheduler may include a plurality of scheduling queues. For example, 64 scheduling queues may be supported in each scheduler. Each scheduling queue services a respective output port, or a group of output ports as taught in the above-referenced co-pending patent application Ser. No. 10/015,994.

The scheduling queues may be accessed one after another in accordance with a round robin process, to search the scheduling queues for respective flows to be dequeued. One scheduling queue may be searched during each operating cycle of the scheduler. However, if the scheduling queue that is searched during a given cycle turns out to be empty, then the cycle may be wasted.

It is known to provide a counter for each scheduling queue to keep track of whether or not the scheduling queue is empty. However, operation of each counter may entail two increment operations (one for attachment of a new flow, and one for reattachment of a previously attached flow) and one decrement operation (reflecting detachment of a winning flow) during each cycle. Thus using a counter to track whether or not a scheduling queue is empty may adversely affect the performance of the scheduler. Moreover, providing a counter for each queue adds to the complexity and space requirements of the scheduler design.

An improved technique for determining whether or not a scheduling queue is empty would therefore be desirable.

SUMMARY OF THE INVENTION

According to an aspect of the invention, a scheduler for a network processor is provided. The scheduler includes one or more scheduling queues, each scheduling queue adapted to define a respective sequence in which flows are to be serviced. The scheduler further includes one or more empty indicators, with each empty indicator being associated with a respective scheduling queue to indicate whether the respective scheduling queue is empty. Each empty indicator may be a bit in a register.

According to another aspect of the invention, a method of dequeuing a flow from a scheduling queue is provided. The method includes examining an empty indicator associated with the scheduling queue, and refraining from searching the scheduling queue if the empty indicator indicates that the scheduling queue is empty. The method further includes searching the scheduling queue if the empty indicator indicates that the scheduling queue is not empty, and detaching from the scheduling queue a winning flow found in the searching step. The examining step may include checking a bit in a register.

According to still another aspect of the invention, a method of enqueuing a flow to a scheduling queue includes attaching a flow to the scheduling queue, and placing an empty indicator associated with the scheduling queue in a condition to indicate that the scheduling queue is not empty. The placing step may include setting or resetting a bit in a register.

According to still a further aspect of the invention, a method of dequeuing a flow from a scheduling queue is provided. The method includes examining an empty indicator associated with the scheduling queue, and refraining from searching the scheduling queue if the empty indicator indicates that the scheduling queue is empty. The method further includes searching the scheduling queue if the empty indicator indicates that the scheduling queue is not empty. According to a further step of the method, if a winning flow is found in the searching step, the winning flow is detached from the scheduling queue. According to still a further step, if no flow is found in the searching step, the empty indicator is placed in a condition to indicate that the scheduling queue is empty. The examining step may include checking a bit in a register.

With the present invention, the empty status of scheduling queues is tracked while minimizing the expenditure of processing and hardware resources.

Other objects, features and advantages of the present invention will become more fully apparent from the following detailed description of exemplary embodiments, the appended claims and the accompanying drawings.

DETAILED DESCRIPTION

Exemplary embodiments of the invention will now be described with reference to FIGS. 4-6.

Figure 4:
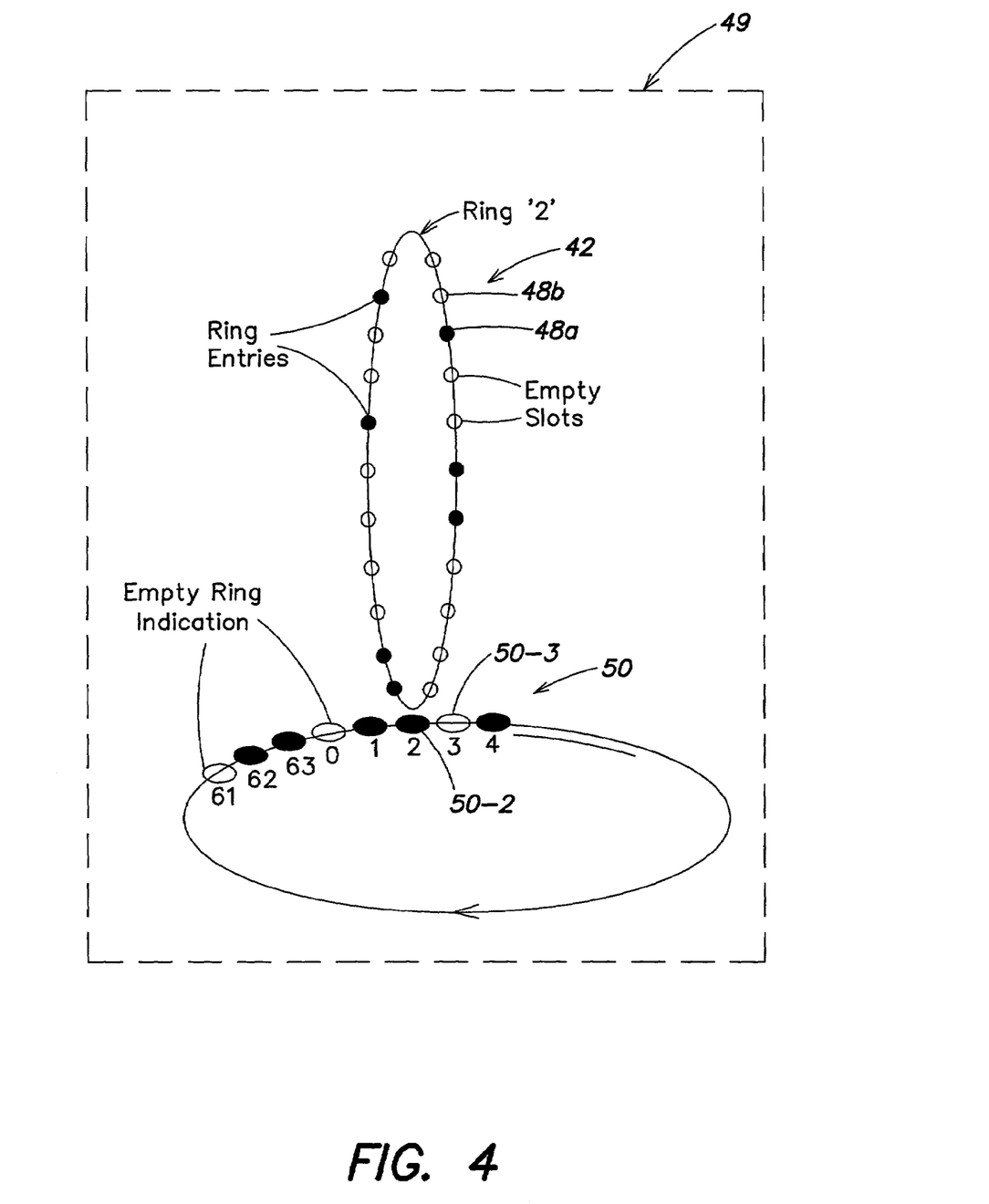
FIG. 4 is a schematic illustration of a manner in which empty indicators are examined and scheduling queues are searched in accordance with a round robin process provided in accordance with the invention.

FIG. 4 is a schematic illustration of a round robin process, provided in accordance with the invention, whereby empty indicators are examined and scheduling queues (also referred to as "rings") of the scheduler 49 are searched for winning flows. It is to be understood that a "winning flow" is a flow that is closest to the current pointer of a scheduling queue. The scheduler 49 may be similar to the conventional scheduler 34 of FIG. 1, but with the additional inventive features described below. In FIG. 4, reference numeral 50 indicates empty indicators, each of which is associated with a respective scheduling queue. For convenience only one scheduling queue (shown as "RING 2") is illustrated in FIG. 4. In one embodiment, each empty indicator 50 is constituted by a respective bit in a register (not separately shown). In general, any conventional register such as a shift register latch (SRL) or other storage means may be employed for each empty indicator 50. As used herein and in the appended claims "empty indicator" does not include a counter.

It will be appreciated that the drawing of FIG. 4 only shows a relatively small portion of a larger number of empty indicators 50 that may be included in a scheduler in accordance with the invention. For example, if 64 scheduling queues are employed within a scheduler, there will be 64 empty indicators each corresponding to a respective one of the 64 scheduling queues maintained in the scheduler. As stated, only one scheduling queue 42 is shown in FIG. 4 for the sake of simplicity. Furthermore, although a relatively large number of slots, such as 512 slots, may be included in each scheduling queue 42, to simplify FIG. 4 the scheduling queue 42 shown in FIG. 4 is illustrated with only about 20 slots. The slots are represented by filled-in circles (e.g., 48a), indicating that the respective slot is occupied by an entry for a flow attached to the scheduling queue 42, and by open circles (e.g., 48b), indicating that there is no entry in the respective slot and that the slot accordingly is empty. It will be observed that the scheduling queue 42 shown in FIG. 4 (indicated as being scheduling queue or ring number 2 of 64 scheduling queues) has a number of filled slots so that the scheduling queue 42 is not empty. Consequently, the corresponding empty indicator for the scheduling queue/ring 2 (represented by reference numeral 50-2) is shown as being filled in, to indicate that the scheduling queue/ring 2 is not empty. On the other hand, other empty indicators, such as 50-3 (which corresponds to another scheduling queue 42 (not shown) represented as "Ring 3"), are open ovals, to indicate that the corresponding scheduling queues (not shown) are empty.

During initialization of the scheduler 49, all of the empty indicators 50 may be initially placed in a condition to indicate that the respective scheduling queues 42 are empty. Thenceforward, each time a flow is attached or reattached to a scheduling queue 42, the corresponding empty indicator 50 is forced to a condition which indicates that the corresponding scheduling queue 42 is not empty.

Placement of the empty indicators 50 into a condition which indicates that the respective scheduling queue 42 is empty, and dequeuing of flows from the scheduling queues 42, will now be described, initially with reference to FIG. 5. FIG. 5 begins with a block 60. In block 60, the scheduler 49 proceeds with a round robin process in which the scheduling queues 42 are traversed in sequence and are given respective opportunities to be serviced. Specifically, the sequence of scheduling queues 42 is traversed to find the next "active" scheduling queue 42.

A scheduling queue 42 is considered to be "active" if it is not empty, and if at least one output port assigned to the scheduling queue 42 is not in a backpressure condition. (The concept of backpressure is well known to those who are skilled in the art, and need not be explained herein.) Thus, for the scheduling queue 42 which follows the most recently searched scheduling queue 42, the corresponding empty indicator 50 is examined to determine whether the empty indicator 50 indicates that the associated scheduling queue 42 is empty. If the empty indicator 50 indicates that the scheduling queue 42 is empty, then the scheduling queue 42 is not searched, and the empty indicator 50 of the following scheduling queue 42 is examined. However, if the empty indicator 50 indicates that the scheduling queue 42 is not empty (and assuming that at least one output port assigned to the scheduling queue 42 is not in a backpressure condition), then the scheduling queue 42 is selected for searching. Searching of the scheduling queue (ring) 42 is indicated at block 62 in FIG. 5. Searching of the scheduling queue 42 for a "winning" flow (i.e., the flow that is closest to the head of the scheduling queue) may proceed in a conventional fashion. Alternatively, the scheduling queue 42 may be constituted in accordance with an invention disclosed in co-pending patent application Ser. No. 10/016,518, filed Nov. 11, 2001, such that the scheduling queue has plural subqueues with mutually different ranges and resolutions. In this case, the plural subqueues may be searched in parallel to find the flow that is closest to the head of the scheduling queue. The disclosure of this copending patent application is incorporated herein by reference.

Following block 62 is decision block 64. In decision block 64, it is determined whether the search of the scheduling queue 42 (selected in block 60 and searched in block 62) has indicated that the scheduling queue 42 is empty. If so, then block 66 follows decision block 64. At block 66, the empty indicator 50 associated with the scheduling queue 42 is placed in a condition to indicate that the scheduling queue 42 is empty. This may be done, for example, by setting or resetting an appropriate bit in a register. Following block 66, the procedure of FIG. 5 loops back to block 60.

If at decision block 64 it is determined that the scheduling queue 42 (selected in block 60 and searched in block 62) was not found to be empty, then decision block 68 follows decision block 64. At decision block 68 it is determined whether a flow that is entitled to scheduled service, or another higher priority flow, is to be serviced from the output port corresponding to the winning flow found at block 62. In other words, it is determined whether a higher priority flow preempts servicing of the winning flow from the scheduling queue 42 searched at block 62. If such is not the case, then block 70 follows decision block 68. At block 70 the winning flow from the scheduling queue 42 is detached from the scheduling queue and serviced in accordance with conventional practice. The procedure of FIG. 5 then loops back to block 60.

Figure 5:
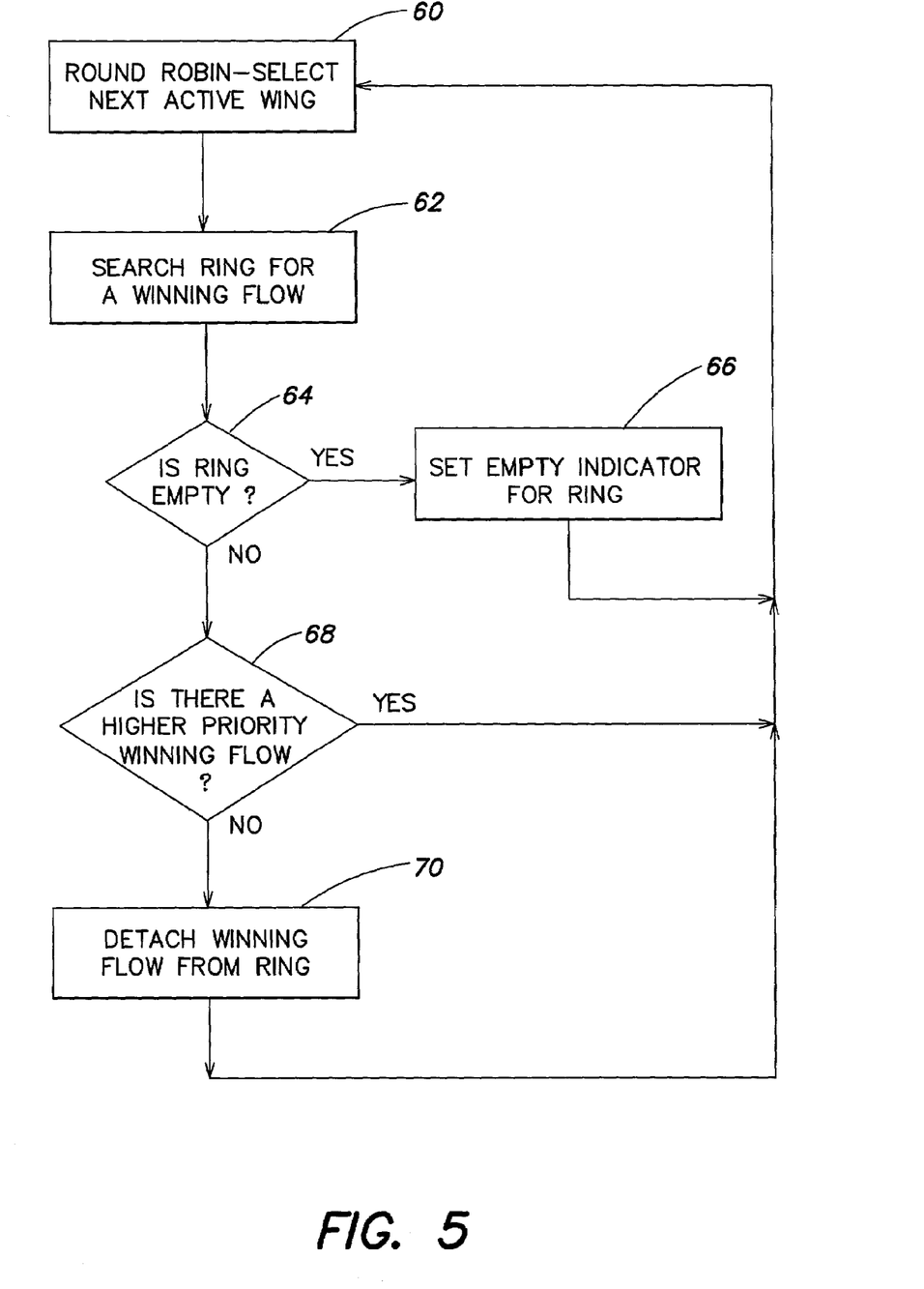
FIG. 5 is a flow chart that illustrates a process for detecting empty scheduling queues and detaching flows from scheduling queues in accordance with the invention.

However, if at decision block 68 it is found that the winning flow from the scheduling queue 42 searched at block 62 is to lose out to a higher priority flow, then the procedure of FIG. 5 loops back to block 60 from decision block 68 without detaching the winning flow from the scheduling queue 42.

In accordance with the procedure of FIG. 5, when a scheduling queue 42 is searched and found to be empty, the empty indicator 50 is placed in a condition to indicate that the scheduling queue 42 is empty. Consequently, the next time the scheduling queue 42 is reached in the selection process (e.g., a round robin process), it will be possible to determine that the scheduling queue 42 is empty by reference to the empty indicator 50 and without searching the empty scheduling queue 42. As a result, the operation cycle of the scheduler 49 may be used for searching a scheduling queue 42 which is not known to be empty. (Of course, this assumes that no flow is attached to the scheduling queue 42 between the time the scheduling queue 42 is found to be empty and the next time that it is reached in the selection process. If a flow is attached to the scheduling queue 42 in the interim, then the empty indicator 50 associated with the scheduling queue 42 is placed in a condition to indicate that the scheduling queue 42 is not empty.)

An alternative procedure is provided in accordance with another aspect of the invention for situations in which a flow detached from a scheduling queue is the only flow that was enqueued in the scheduling queue. This alternative procedure is illustrated by the flow chart of FIG. 6. It will be observed that the flow chart of FIG. 6 has the same blocks 60-70 as the flow chart of FIG. 5. Blocks 60-70 perform the same functions in the procedure of FIG. 6 as in the procedure of FIG. 5 and accordingly need not be explained again. However, in the procedure of FIG. 6, block 70 (detachment of the winning flow from the scheduling queue 42) is followed by a block 72. At block 72, the winning flow is masked and a further search of the scheduling queue 42 (selected in block 60 and searched in block 62) is carried out to determined whether the scheduling queue 42 was empty but for the winning flow found at block 62 and detached at block 70.

Following block 72 is a decision block 74. If it is determined at decision block 74 that the scheduling queue 42 was empty but for the flow that was just detached, then block 66 follows block 74. As noted before in conjunction with FIG. 5, block 66 involves placing the corresponding empty indicator 50 for the scheduling queue 42 in a condition to indicate that the scheduling queue 42 is empty. Following block 66 the procedure of FIG. 6 loops back to block 60.

Figure 6:
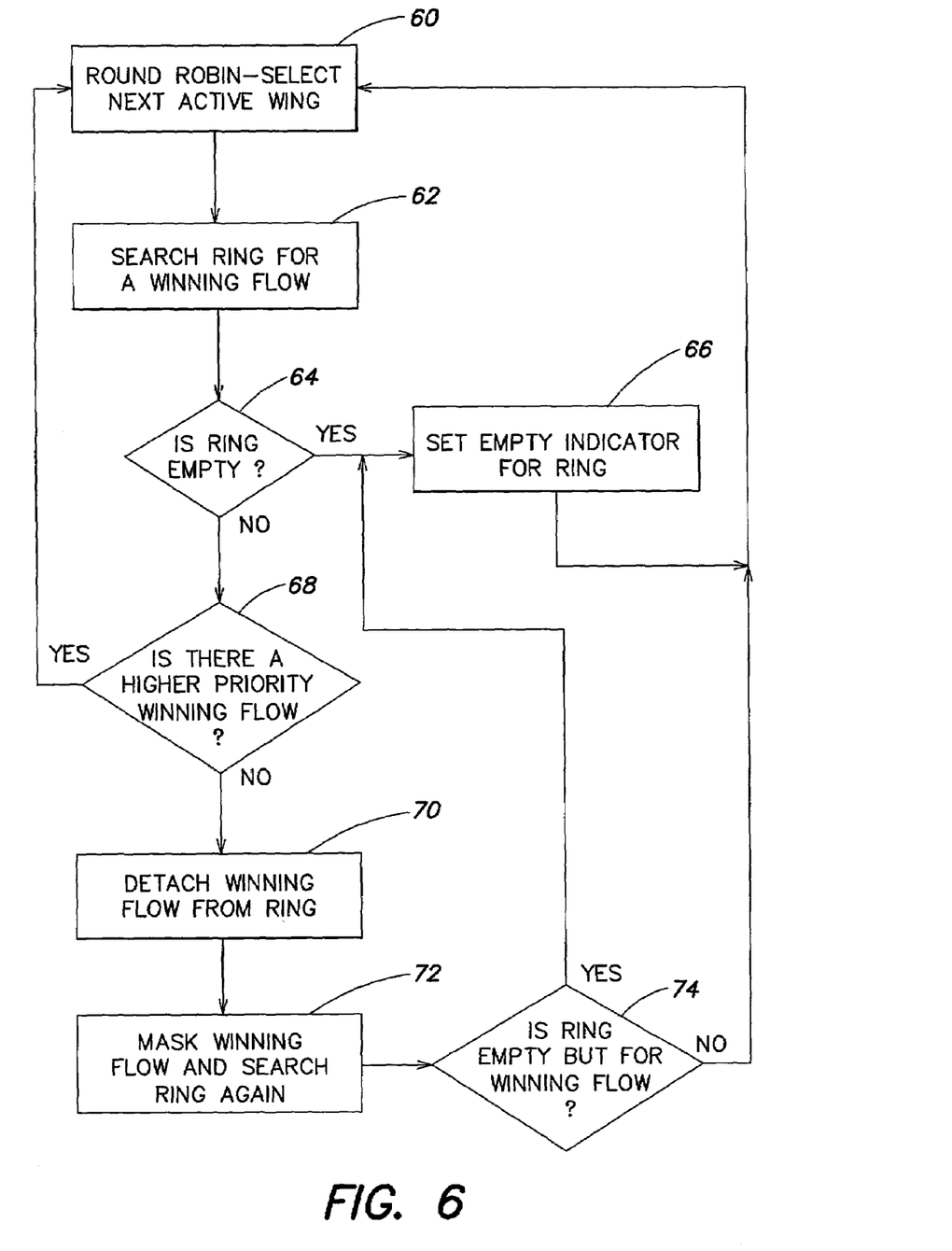
FIG. 6 is a flow chart that illustrates an alternative process provided in accordance with the invention for detecting empty scheduling queues and detaching flows from scheduling queues.

However, if it is determined at decision block 74 that the flow detached at block 70 was not the only flow enqueued in the scheduling queue 42, then the procedure of FIG. 6 loops back directly to block 60 from decision block 74, i.e., without placing the empty indicator 50 associated with the scheduling queue 42 in a condition to indicate that the scheduling queue 42 is empty. (It is to be understood that in the event that more than one frame is enqueued in the flow queue corresponding to the flow detached at block 70, then the flow will be reattached to the scheduling queue 42 in due course according to conventional practice. Of course, upon the reattachment of the flow to the scheduling queue 42, the empty indicator 50, which had been placed in a condition to indicate the scheduling queue 42 was empty, will once again be placed in a condition to indicate that the scheduling queue 42 is not empty.)

The procedure of FIG. 6 is advantageous as compared to the procedure of FIG. 5, in that, with the procedure of FIG. 5, a scheduling queue may be emptied by detachment of the last flow therefrom, without the corresponding empty indicator being set to indicate that the scheduling queue is empty. By contrast, with the inclusion of blocks 72 and 74 in FIG. 6, detachment of the last flow from a scheduling queue is detected and the placement of the corresponding empty indicator in a condition to indicate that the scheduling queue is empty occurs immediately, thereby substantially eliminating indications that a scheduling queue is not empty when in fact it is empty. (Block 64 remains desirable in the procedure of FIG. 6, however, to deal with rare "race" conditions in which an empty indicator does not indicate a scheduling queue is empty in time to avoid a false indication that the scheduling queue is not empty.) The processes of FIGS. 5 and 6 may be implemented in hardware, software or a combination thereof.

In at least one embodiment of the invention, the processes of FIGS. 5 and 6 are implemented in hardware employing a suitable combination of conventional logic circuitry such as adders, comparators, selectors, etc. Such hardware, for example, may be located within the scheduler 49 (FIG. 4). A person of ordinary skill in the art may develop logic circuitry capable of performing the inventive processes described with reference to FIGS. 5 and 6. In a software embodiment of the invention, the processes of FIGS. 5 and 6 may comprise one or more computer program products. Each inventive computer program product may be carried by The empty indicator arrangement of the present invention provides an efficient and cost effective way of identifying empty scheduling queues before they are searched. Consequently, operating cycles of a scheduler employing the inventive empty indicators are less likely to be wasted in searching a scheduling queue that is empty.

The foregoing description discloses only exemplary embodiments of the invention; modifications of the above disclosed apparatus and methods which fall within the scope of the invention will be readily apparent to those of ordinary skill in the art. For example, in the embodiments described above, scheduling queues are maintained in a separate scheduler chip associated with a network processor. However, it is also contemplated that scheduling queues may be maintained in a scheduler circuit that is implemented as part of a data flow chip or as part of a processor chip in a network processor.

Accordingly, while the present invention has been disclosed in connection with exemplary embodiments thereof, it should be understood that other embodiments may fall within the spirit and scope of the invention as defined by the following claims.

The invention claimed is:

1. A method of dequeuing a flow from a scheduling queue having an empty indicator, the method comprising:
    determining if an empty indicator of a scheduling queue is set to empty wherein the empty indicator is configured to indicate the queue is not empty when a flow is attached or reattached to the queue;
    searching the scheduling queue if the empty indicator is set to not empty;
    determining if the scheduling queue is empty based on the search;
    setting the empty indicator to empty if the search determines that the scheduling queue is empty;
    finding a flow attached to the scheduling queue if the search does not determine that the queue is empty;
    determining whether a higher priority flow preempts servicing of the flow attached to the scheduling queue; and
    detaching the flow found when the scheduling queue is searched wherein the detached flow is a winning flow.

2. The method of claim 1, further comprising selecting the scheduling queue from among a plurality of scheduling queues in a round robin process.

3. The method of claim 1, wherein the searching step includes searching a plurality of subqueues included in the scheduling queue, the subqueues having mutually different respective ranges and resolutions.

4. The method as recited in claim 1, further comprising:
    attaching a flow to the scheduling queue; and
    placing the empty indicator associated with the scheduling queue in a condition to indicate that the scheduling queue is not empty.

5. The method of claim 4, wherein the attaching step includes assigning the flow to a slot in the scheduling queue according to the formula $CP+((WF \times FS)/SF)$, where: CP is a pointer that indicates a current position in the scheduling queue;
    WF is a weighting factor associated with the flow;
    FS is a size of a data frame associated with the flow; and
    SF is a scaling factor.

6. The method of claim 4, wherein the placing step includes setting a bit in a register.

7. The method of claim 4, wherein the placing step includes resetting a bit in a register.

8. The method of claim 1, wherein, if the detaching step is performed, a further search of the scheduling queue is performed to determine whether any flows are enqueued in the scheduling queue other than the flow detached in the detaching step.

9. The method of claim 8, wherein the empty indicator is placed in a condition to indicate that the scheduling queue is empty if the further search of the scheduling queue determines that there are no flows in the scheduling queue other than the flow detached in the detaching step.

10. A scheduler for a network processor, comprising:
    one or more scheduling queues, each adapted to define a respective sequence in which flows are to be serviced; and
    a plurality of empty indicators, each empty indicator of the plurality of empty indicators being associated with a respective scheduling queue to indicate whether the respective scheduling queue is empty;
    wherein the scheduler is adapted to:
        determine if an empty indicator of the plurality of empty indicators is set to empty wherein the empty indicator is configured to indicate the queue is not empty when a flow is attached or reattached to the respective scheduling queue;
        search the scheduling queue if the empty indicator indicates that a flow is associated with the scheduling queue;
        determine if the scheduling queue is empty based on the search;
        set the empty indicator to empty if the search determines that the scheduling queue is empty;
        finding a flow attached to the scheduling queue if the search does not determine the the scheduling queue is empty;
        determining whether a higher priority flow preempts servicing of the found flow; and
        detach the flow found during the search wherein the detached flow is a winning flow.

11. A computer program product adapted to dequeue a flow from a scheduling queue, the computer program product comprising:
    a medium readable by a computer, the computer readable medium having computer program code executable on a computer to:
        determine if an empty indicator is set to empty;
        search the scheduling queue if the empty indicator indicates that a flow is associated with the scheduling queue wherein the empty indicator is configured to indicate the queue is not empty when a flow is attached or reattached to the respective scheduling queue;
        determine if the scheduling queue is empty based on the search;
        set the empty indicator to empty if the search determines that the scheduling queue is empty;
        find a flow that is attached to the scheduling queue if the search determines that the scheduling queue is not empty;
        determine whether a higher priority flow preempts servicing of the flow found during the search; and
        detach the flow found during the search from the scheduling queue wherein the detached flow is the winning flow.

12. A method of enqueuing a flow to a scheduling queue, comprising:

placing an empty indicator associated with the scheduling queue in a condition to indicate the scheduling queue is not empty wherein the empty indicator is:
one of a plurality of empty indicators; and
configured to indicate the queue is not empty when a flow is attached or reattached to the respective scheduling queue;

attaching a flow to the scheduling queue; and placing the empty indicator in a condition to indicate that the scheduling queue is not empty;

wherein placing the empty indicator in the condition to indicate the scheduling queue is not empty is performed due to attaching the flow to the scheduling queue; and wherein the attaching step includes assigning the flow to a slot in the scheduling queue according to the formula $CP+((WF \times FS)/SF)$, where:

CP is a pointer that indicates a current position in the scheduling queue;

WF is a weighting factor associated with the flow; FS is a size of a data frame associated with the flow; and SF is a scaling factor.

* * * * *